May 3, 1932.  H. R. GOTTHARDT  1,856,547
DUSTPROOF BALL BEARING
Filed Sept. 5, 1931
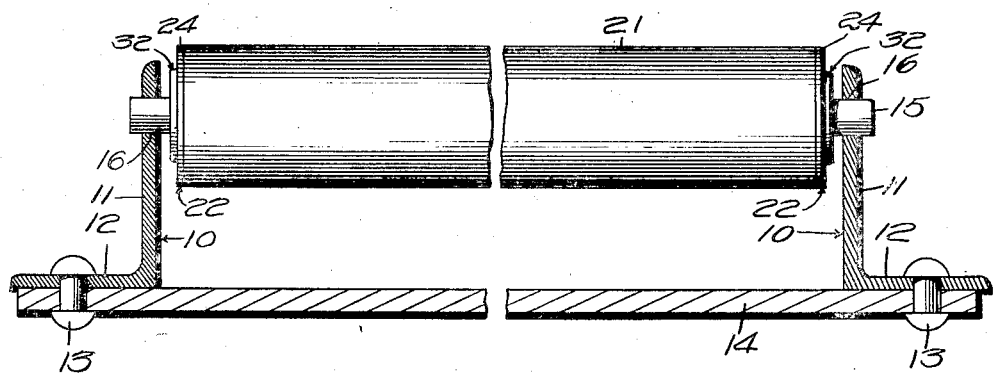
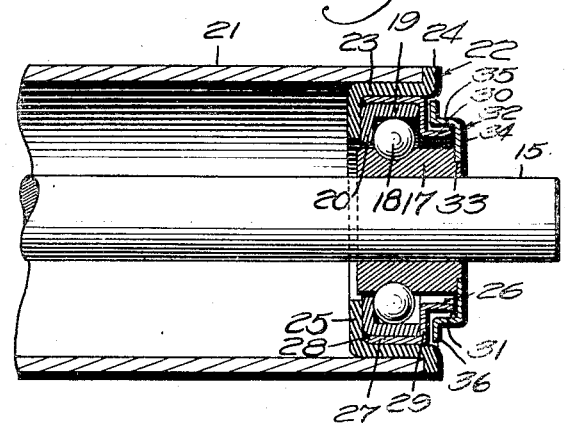
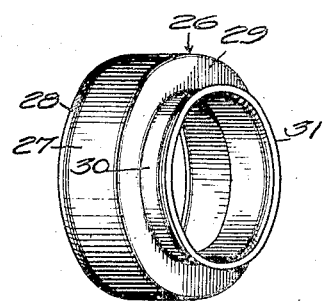
Inventor
HENRY R. GOTTHARDT
By
C. L. Parker, Jr.
Attorney Patented May 3, 1932

1,856,547

UNITED STATES PATENT OFFICE

HENRY R. GOTTHARDT, OF LOUISVILLE, KENTUCKY, ASSIGNOR TO LOGAN CO. INC., OF LOUISVILLE, KENTUCKY, A CORPORATION OF KENTUCKY

DUSTPROOF BALL BEARING

Application filed September 5, 1931. Serial No. 561,434.

This invention relates to dustproof ball bearings, and more particularly to a ball bearing mounting for the rollers of gravity conveyors.

The bearings for the rollers of gravity conveyors are particularly exposed to the effect of dust and other foreign material, and are affected thereby as will be apparent. Attempts have been made to provide bearing mountings for gravity conveyor rollers by means of which such dust and foreign material may be excluded from the ball bearings, but such attempts have not met with complete success. In some cases, the devices, while not affecting the operation of the rollers, are not completely effective for excluding foreign matter from the ball bearings, while others are completely effective for relatively short periods of time, although during such periods they interfere with the normal operation of the rollers.

For example, it has been the more or less common practice to provide ball bearing mountings including felt washers operative for excluding dust from the ball bearings, and such devices are effective during the first periods of their use. The difficulty with such a construction lies in the fact that the felt washers must be disposed between relatively movable parts, the washer being connected to one of such parts whereby it operates frictionally against the other and tends to retard the free rotation of the roller. After a relatively short period of time, such felt washers become worn whereby free movement of the roller is permitted, but the wearing of the washer permits the entrance of dust into contact with the ball bearings.

An important object of the present invention is to provide means for excluding dust and other foreign material from contact with ball or similar bearings, and more particularly the ball bearings used in connection with the rollers of gravity conveyors.

A further object is to provide a ball bearing device of the character referred to wherein dust and other foreign material is effectively excluded from the ball bearings without affecting the free rotation of the conveyor rollers.

A further object is to provide dust excluding means for ball bearings wherein dust can enter the bearing only by following a tortuous path, and wherein the device acts to dump or exclude dust after it has passed partially along such path.

A further object is to provide dust excluding means of the character referred to having a portion which acts effectively for tying several of the elements of the bearing and associated parts together.

A further object is to provide means for excluding dust from ball bearings which is extremely simple in construction and readily assembled.

Other objects and advantages of the invention will become apparent during the course of the following description.

In the drawings I have shown one embodiment of the invention. In this showing,

Figure 1 is a transverse sectional view of a portion of a gravity conveyor, parts being shown in elevation, Figure 2 is an enlarged axial sectional view through one end of a conveyor roller and associated elements, parts being shown in elevation, and, Figure 3 is a detail perspective view of the shell of the device shown detached.

Referring to the drawings, the numeral 10 designates a pair of spaced parallel side rails of the usual type employed with gravity conveyors. Each of the side rails includes a vertical flange 11 and a horizontal flange 12, and the latter flanges are riveted or otherwise secured as at 13 at spaced intervals therealong to tie bars or transverse connecting members 14. The structure previously described, as a whole, is supported in any suitable manner, as will be apparent.

The side rails 10 are adapted to support conveyor rollers and associated elements, and one roller assembly has been illustrated in detail in the drawings. Such assembly includes a shaft 15 having its ends projecting through openings 16 formed in the flanges 11, and means (not shown) of any conventional type is employed for preventing rotation of the shaft 15.

Inwardly of and adjacent each side rail 10, the shaft is provided with an inner ball race 17 having the usual annular groove receiving a plurality of balls 18. The balls are arranged within an outer race 19 the inner end of which is turned inwardly to form an internal annular flange 20. The flanges 20 adjacent opposite ends of the shaft act against the balls to prevent longitudinal movement of the roller to be described.

The usual roller 21 surrounds the shaft 15 and is provided with a cup indicated as a whole by the numeral 22 in each end thereof. Each cup includes a cylindrical portion 23 pressed into the end of the roller 21, and terminating at its outer end in an outstanding annular flange 24 contacting with the extremity of the roller to limit the inward movement of the cup. Each cup further includes an inturned annular flange 25 at its inner end contacting with the flange 20 of the outer ball race.

Referring to Figures 2 and 3, the numeral 26 designates a shell as a whole including a cylindrical portion 27. It will be noted that the internal diameter of the cup portion 23 and the external diameter of the outer ball race are such as to provide a space between these elements, and this space is equal to the thickness of the cylindrical portion 27 of the shell to permit it to snugly fit in such space. Prior to the placing of the shell in operative position within the cup 23, the extremity of the cylindrical portion 27 thereof is spun or rolled inwardly as at 28 to contact with the slight curvature joining the outer faces of the body of the outer ball race and the flange 20 thereof. Accordingly it will be apparent that when the device has been assembled, the shell 26 cannot be withdrawn from the outer ball race. It also will be apparent that since the thickness of the shell is equal to the space between the outer ball race and the cup portion 23, the shell and the outer ball race may be driven into position in the cup and will be tightly frictionally retained therein. The roller 21, cup 22, shell 26 and outer ball race 27 accordingly rotate as a unit.

Outwardly of the cylindrical portion 27, the shell 26 is turned inwardly to form an annular flange portion 29 which bears against the outer extremity of the outer ball race, and the portions 28 and 29 of the shell 26 obviously prevent movement in either direction of the shell and the outer ball race relative to each other. From the flange portion 29, the shell 26 extends outwardly to form a second substantially cylindrical portion 30 of reduced diameter surrounding and spaced from the inner ball race, and the outer extremity of the shell is flared outwardly as at 31, for a purpose to be described.

A dust excluding plate 32 cooperates with the shell 26 to exclude foreign material from contact with the rollers 18. As shown in Figure 2, the inner ball race is provided with a reduced outer end 33 against which tightly seats the inner flange portion 34 of the plate 32. Outwardly of the flange portion 34, the dust plate 32 extends inwardly in a substantially cylindrical portion 35 surrounding the portions 30 and 31 of the shell 26 and spaced therefrom. The innermost portion of the plate 32 again extends outwardly to form an outstanding annular flange 36 slightly spaced from the parallel to the flange portion 29 of the shell 26. It will be apparent that the extremity of the flared portion 31 of the shell is arranged sufficiently close to the flange portion 34 of the plate 32 so as merely to provide clearance between these elements.

The operation of the device is as follows:

After the ball bearings and their races have been assembled with respect to each other, the shell 26 is slipped over the outer end of the outer ball race, whereupon the inner edge of the shell is rolled or otherwise turned inwardly as at 28 to permanently fix the shell to the outer ball race. These elements are then inserted into the cup 22 and will be retained therein by the frictional engagement between the shell 26 and the inner surface of the cup 23. The dust plate 32 may have a driving fit with the shoulder 33, or may be positively secured thereto in any suitable manner.

Assuming that dust or other foreign material enters the space between the flange portions 29 and 36 of the shell and dust plate respectively, such foreign material at the top of the device will be supported upon the cylindrical portion 30 of the shell, the outwardly flaring end 36 of the shell tending to prevent such foreign material from moving between the shell and dust plate and into contact with the balls 18. The entrance of the dust into the space referred to also is largely prevented by virtue of the fact that only a slight clearance is provided between the dust plate and the outer extremity of the shell 26. The features referred to have been found in practice to act quite efficiently in preventing the entrance of dust into the ball bearing space. Moreover, it will be noted that the flange portion 29 of the shell 26 is arranged a substantial distance inwardly of the outer face of the flange 24, thus forming a recess in which the flange 36 of the dust plate is arranged.

This arrangement of the flange 36, together with the fact that this element is arranged relatively close to the adjacent portions of the shell 26 and cup 22 tends initially to very greatly minimize the entrance of dust into the space between the flanges 29 and 36, and it will be apparent that the small quantity of dust which finds its way into the space between the shell and dust plate cannot move inwardly into the ball bearing space. Moreover, it will be apparent that dust collecting on the upper portions of the cylindrical surface 30 will be carried downwardly thereby during rotation of the roller and will fall downwardly through the space between the flanges 29 and 36. Accordingly it will be apparent that the device is self-cleaning.

As previously stated, the dust plate 32 is fixed against rotation by being secured to the stationary inner ball race 17, while the shell 26 rotates with the roller. A sufficient clearance, however, is provided between the shell and the dust plate so as to prevent actual contact with these elements, and accordingly the device does not introduce any friction which would tend to retard rotation of the roller 21, and accordingly the roller rotates as freely as it would if the present device were not provided.

It will be apparent that the present device consists mainly of simple sheet metal members which may be readily and cheaply manufactured. The dust plate is not subjected to strains of any kind, and it is found that it may be readily permanently connected to the inner ball race merely by providing a driving fit between the dust plate and the shoulder 32. It also will be apparent that the shell 26 is readily secured in position without the use of any fastening elements, and in fact the shell acts as securing means whereby the outer ball race 19 and cup 22 are anchored with respect to each other and with respect to the shell. Inasmuch as the shell also limits inward movement of the outer ball race, it will be apparent that the shell acts also to retain the other elements of the assembly in proper position.

While the device has been particularly illustrated and described in connection with a gravity conveyor roller, it will be obvious that it is not so limited in its use, but may be applied to any analogous uses for preventing the entrance of dust and other foreign material into the ball bearings of rotatable members.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A ball bearing mounting for inner and outer coaxial relatively rotatable members comprising an inner race fixed to the inner member, an outer race surrounding said inner race, anti-friction elements arranged between said races, a cup arranged in the end of the outer member, said cup and said outer race having spaced concentric portions, a shell having a portion arranged between said concentric portions and frictionally engaging such portions to secure said cup and said outer race against movement with respect to each other, said shell having an annular flange portion arranged outwardly of said outer race and a reduced cylindrical flange extending outwardly from the last named portion, and a dust plate fixed to said inner race and having a radial annular flange portion lying adjacent the cylindrical flange of said shell and a cylindrical portion surrounding said cylindrical flange in slightly spaced relation thereto and concentric therewith.

2. A ball bearing mounting for inner and outer coaxial relatively rotatable members comprising an inner race fixed to the inner member, an outer race surrounding said inner race, anti-friction elements arranged between said races, a cup arranged in the end of the outer member, said cup and said outer race having spaced concentric portions, a shell having a portion arranged between said concentric portions and frictionally engaging such portions to secure said cup and said outer race against movement with respect to each other, said shell having an annular flange portion arranged outwardly of said outer race and a reduced cylindrical flange extending outwardly from the last named portion, said cylindrical flange having its extremity slightly flared to increase in diameter, and a dust plate secured at its inner edge to said inner ball race and comprising an outstanding radial flange portion lying adjacent and slightly spaced from the flared extremity of said shell, an inwardly extending cylindrical flange surrounding the cylindrical flange of said shell, and an outstanding radial flange lying adjacent and parallel to the annular flange portion of said shell.

3. A ball bearing mounting for a conveyor roller and a concentric stationary shaft therefor, comprising an inner race secured to the shaft, an outer race surrounding the inner race, anti-friction balls operable between said races, a cup fitting in the end of the roller and surrounding the outer race in concentric spaced relation thereto, a shell having one end cylindrical and tightly fitting the concentric space between said cup and said outer race, said shell intermediate its ends having a radial flange portion lying adjacent the outer end of the outer ball race, the outer end of said shell forming a cylindrical flange spaced from and surrounding the outer end of the inner ball race concentric therewith, and an annular dust plate secured to the outer end of the inner ball race and having imperforate portions lying outwardly of and surrounding the cylindrical flange of said shell.

4. A ball bearing mounting for a conveyor roller and a concentric stationary shaft therefor, comprising an inner race secured to the shaft, an outer race surrounding the inner race, anti-friction balls operable between said races, a cup fitting in the end of the roller and surrounding the outer race in concentric spaced relation thereto, a shell having one end cylindrical and tightly fitting the concentric space between said cup and said outer race, said shell intermediate its ends having a radial flange portion lying adjacent the outer end of the outer ball race, the outer end of said shell forming a cylindrical flange spaced from and surrounding the outer end of the inner ball race concentric therewith, and an annular dust plate secured to the outer end of the inner ball race and comprising a radial flange portion lying adjacent the cylindrical flange of said shell, a cylindrical flange surrounding said cylindrical flange, and a radial flange portion at the outer extremity of the dust plate lying adjacent and parallel to the radial flange portion of said shell.

5. A device constructed in accordance with claim 4 wherein said dust plate is provided with a central opening surrounding and frictionally engaging a concentric portion of the outer end of said inner race, the outer extremity of the cylindrical flange of said shell being slightly flared to increase in diameter.

6. A device constructed in accordance with claim 4 wherein said outer race comprises an annular cylindrical portion and an inwardly extending radial flange at the inner end thereof, the radial flange portion of said shell lying adjacent and forming a closure for the outer end of said outer race to limit the longitudinal movement thereof in one direction by contact with said anti-friction balls.

7. A device constructed in accordance with claim 4 wherein said cup is provided at its inner end with an inwardly extending radial flange engaging the inner end of the outer race to limit the movement thereof inwardly of the end of the roller, said cup further being provided at its outer end with an outstanding annular flange engaging against the outer end of the roller.

8. A device constructed in accordance with claim 4 wherein said outer race includes an inwardly extending radial flange at the inner end thereof, the inner end of said shell being turned slightly over the inner end portion of said outer race to fix said shell thereto, said cup being provided at its inner end with an inwardly extending radial flange engaging against the radial flange of said outer race.

9. A device constructed in accordance with claim 4 wherein said cup is provided at its outer end with an outstanding annular flange engaging the outer end of the roller, the radial flange portion of said shell lying inwardly of the outer extremity of the cup to form an annular pocket, the radial flange portion at the outer extremity of said dust plate lying within said pocket.

10. A device constructed in accordance with claim 4 wherein the radial flange portion of said shell is arranged against the outer extremity of the outer ball race, the inner extremity of said shell being turned slightly over the inner end portion of the outer race to prevent longitudinal movement of the outer race and the shell with respect to each other, said cup being provided at its inner end with a portion contacting with the inner extremity of the outer ball race to limit inward longitudinal movement thereof, and being provided at its outer end with an outstanding radial flange engaging against the end of the roller, the radial flange portion of said shell being arranged inwardly of the outer end of the cup to form an annular pocket, the radial flange portion at the outer extremity of the dust plate lying within said pocket.

In testimony whereof I affix my signature.

HENRY R. GOTTHARDT.